(12) United States Patent
Svetal

(10) Patent No.: US 9,239,943 B2
(45) Date of Patent: Jan. 19, 2016

(54) OBJECT RECOGNITION FOR EXCEPTION HANDLING IN AUTOMATIC MACHINE-READABLE SYMBOL READER SYSTEMS

(71) Applicant: Datalogic ADC, Inc., Eugene, OR (US)

(72) Inventor: Michael Svetal, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 0 days.

(21) Appl. No.: 14/289,950

(22) Filed: May 29, 2014

(65) Prior Publication Data

US 2015/0347801 A1    Dec. 3, 2015

(51) Int. Cl.
*G06K 7/10*      (2006.01)
*G06K 7/14*      (2006.01)

(52) U.S. Cl.
CPC .................................... *G06K 7/1447* (2013.01)

(58) Field of Classification Search
CPC ... G06Q 10/08; G06Q 10/06; G06Q 10/0833; G06Q 10/087; G06Q 50/28; B60R 25/1025; G06F 17/30; G06F 17/30241; G06F 17/30598; G07C 5/008; G08B 13/2402; G08B 21/24
USPC ........ 235/454, 472.01–472.03, 483, 484, 485
See application file for complete search history.

(56) References Cited

U.S. PATENT DOCUMENTS

| | | | |
|---|---|---|---|
| 5,497,314 A | 3/1996 | Novak | |
| 6,050,731 A | 4/2000 | Matsui | |
| 6,711,293 B1 | 3/2004 | Lowe | |
| 7,031,525 B2 | 4/2006 | Beardsley | |
| 7,118,026 B2 | 10/2006 | Harris et al. | |
| 7,422,147 B2 | 9/2008 | Rosenbaum | |
| 7,519,201 B2 | 4/2009 | Yang et al. | |
| 7,599,543 B2 | 10/2009 | Jones et al. | |

(Continued)

FOREIGN PATENT DOCUMENTS

| | | |
|---|---|---|
| JP | 3-238573 A | 10/1991 |
| JP | 2013-21519 A | 1/2013 |

(Continued)

OTHER PUBLICATIONS

US 8,348,169 1/2013 Wang et al. (withdrawn).

(Continued)

*Primary Examiner* — Thien M Le
(74) *Attorney, Agent, or Firm* — Seed IP Law Group PLLC

(57) ABSTRACT

Systems and methods for exception handling in an automated machine-readable symbol reader system having a machine-readable symbol reader that captures machine-readable symbols within a view volume. One or more image capture devices obtain a plurality of images of an exception object in response to an exception generated in the view volume. A processor receives the images, identities visual object recognition features from each image, and compares the features to determine one or more descriptive measures indicative of a likelihood that an operator (e.g., store employee) will be able to identify the exception object by viewing the image. The processor displays at least one of the images (e.g., the most descriptive image) on a display device according to the descriptive measure so that an operator can rapidly identify the identity of the exception object and take steps to resolve the exception.

35 Claims, 8 Drawing Sheets

(56) References Cited

U.S. PATENT DOCUMENTS

| | | | |
|---|---|---|---|
| 7,602,956 B2 | 10/2009 | Jones et al. | |
| 8,033,470 B2 | 10/2011 | Maeda et al. | |
| 8,196,822 B2 | 6/2012 | Goncalves | |
| 8,224,110 B2 | 7/2012 | Mishima et al. | |
| 8,306,318 B2 | 11/2012 | Cao et al. | |
| 8,353,457 B2 | 1/2013 | Olmstead | |
| 8,396,278 B2 | 3/2013 | Jones et al. | |
| 8,489,232 B2 | 7/2013 | Mishra et al. | |
| 8,538,081 B2 | 9/2013 | Ding et al. | |
| 8,902,760 B2* | 12/2014 | Austermann et al. | 370/241 |
| 2004/0143504 A1* | 7/2004 | Tsai | 705/16 |
| 2007/0061226 A1* | 3/2007 | Ajiki et al. | 705/28 |
| 2007/0120736 A1* | 5/2007 | MacKenzie et al. | 342/357.07 |
| 2008/0087727 A1* | 4/2008 | Jenney et al. | 235/385 |
| 2009/0084854 A1 | 4/2009 | Carlson et al. | |
| 2009/0198371 A1* | 8/2009 | Emanuel et al. | 700/226 |
| 2011/0106653 A1* | 5/2011 | Wein | 705/26.8 |
| 2011/0286628 A1 | 11/2011 | Goncalves et al. | |
| 2012/0153662 A1 | 6/2012 | MacNeil et al. | |
| 2012/0187191 A1 | 7/2012 | Olmstead | |
| 2013/0001295 A1* | 1/2013 | Goncalves | 235/375 |
| 2013/0020391 A1 | 1/2013 | Olmstead et al. | |
| 2013/0077873 A1 | 3/2013 | Bar Hillel et al. | |
| 2013/0315437 A1 | 11/2013 | Kerschner et al. | |
| 2014/0029857 A1 | 1/2014 | Kompalli et al. | |

FOREIGN PATENT DOCUMENTS

| | | | |
|---|---|---|---|
| WO | 2012/103139 A2 | 8/2012 | |
| WO | 2013/090023 A2 | 6/2013 | |
| WO | 2013/150604 A1 | 10/2013 | |

OTHER PUBLICATIONS

"Histogram of oriented gradients," Wikipedia, the free encyclopedia, retrieved on Jun. 5, 2014, from http://en.wikipedia.org/wiki/Histogram_of_oriented_gradients, 7 pages.

Dalal et al., "Histograms of Oriented Gradients for Human Detection," IEEE Computer Society Conference on Computer Vision and Pattern Recognition, San Diego, CA, Jun. 25, 2005, 8 pages.

Dollár et al., "Crosstalk Cascades for Frame-Rate Pedestrian Detection," European Conference on Computer Vision, Sep. 2012, 14 pages.

Dollár et al., "Fast Feature Pyramids for Object Detection," Submission to IEEE Transactions on Pattern Analysis and Machine Intelligence, 2014, 14 pages.

Dollár et al., "The Fastest Pedestrian Detector in the West," Proceedings of the British Machine Vision Conference, BMVA Press, Sep. 2010, 11 pages.

Dollár et al., "Integral Channel Features," British Machine Vision Conference, London, England, 2009, 11 pages.

Lowe, "Object Recognition from Local Scale-Invariant Features," Proceedings of the International Conference on Computer Vision, Sep. 1999, 8 pages.

Minetto et al., "SnooperText: A text detection system for automatic indexing of urban scenes," *Computer Vision and Image Understanding*, 2013, 13 pages.

Minetto et al., "T-HOG: an Effective Gradient-Based Descriptor for Single Line Text Regions," Preprint submitted to Pattern Recognition, Nov. 1, 2012, 36 pages.

Munich et al., "SIFT-ing Through Features with ViPR," IEEE Robotics & Automation Magazine, Sep. 2006, pp. 72-77.

Ott, "Segmentation Features, Visibility Modeling and Shared Parts for Object Detection," PhD thesis, The University of Leeds School of Computing, Feb. 2012, 215 pages.

Ott et al., "Implicit Color Segmentation Features for Pedestrian and Object Detection," IEEE 12th International Conference on Computer Vision, Kyoto, Japan, Sep. 29-Oct. 2, 2009, 8 pages.

Prates et al., "Brazilian License Plate Detection Using Histogram of Oriented Gradients and Sliding Windows," *International Journal of Computer Science & Information Technology* 5(6):39-52, Dec. 2013.

Wang et al., "Word Spotting in the Wild," Proceedings of the 11th European Conference on Computer Vision: Part 1, Springer-Verlag Berlin, 2010, pp. 591-604.

Deppieri et al., "Optical Character Recognition Localization Tool," U.S. Appl. No. 14/815,741, filed Jul. 31, 2015, 38 pages.

Goncalves, "Robust Industrial Optical Character Recognition," U.S. Appl. No. 14/450,394, filed Aug. 4, 2014, 57 pages.

\* cited by examiner

OBJECT RECOGNITION FOR EXCEPTION HANDLING IN AUTOMATIC MACHINE-READABLE SYMBOL READER SYSTEMS

BACKGROUND

1. Technical Field

The present disclosure relates to object recognition for objects bearing machine-readable symbols.

2. Description of the Related Art

Machine-readable symbols encode information in a form that can be optically read via an appropriately configured machine-readable symbol reader or scanner. Machine-readable symbols take a variety of forms, the most commonly recognized form being the linear or one-dimension barcode symbol. Other forms include two-dimensional machine-readable symbols such as stacked code symbols, and area or matrix code symbols. These machine-readable symbols are typically composed on patterns of high and low reflectance areas. For instance, a barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), European Article Number (EPN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbol readers or machine-readable symbol readers are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Machine-readable symbol readers may be generally classified into one of three types: manual readers, semi-automatic readers, and automated readers. With manual or semi-automatic readers (e.g., a hand-held type reader, or a fixed-position reader), a human operator positions an object relative to the view volume of the reader to read the machine-readable symbol associated with the object. In an automated reader (e.g., a portal or tunnel scanner), a conveyor automatically positions the object relative to the view volume, and transports the object through the view volume so that the reader can automatically read the machine-readable symbol associated with the object.

When a machine-readable symbol reader attempts to read a machine-readable symbol on an object, certain read errors may occur, or the reader may fail to read the machine-readable symbol. For example, when a read error or read failure occurs with a manual or semi-automatic reader, the reader may prompt the human operator to rescan the machine-readable symbol or to manually enter (e.g., via a keyboard) a number (e.g., a UPC number) corresponding to the object. In an automated reader, the reader needs to determine automatically whether an error or an unexpected event (i.e., "exception") occurs and, if such an error or unexpected event occurs, take appropriate exception action. Accordingly, the present inventor has recognized a need to accurately identify and handle read errors or read failures and unexpected events that may occur in automated readers.

BRIEF SUMMARY

A method of operation for an automated machine-readable symbol reader system may be summarized as including receiving a plurality of images of an exception object in at least one processor-readable medium, the exception object having not been successfully identified by a machine-readable symbol reader of the machine-readable symbol reader system; extracting, by at least one processor, one or more visual features from each of the plurality of received images; accessing a database of visual model data associated with a plurality of known objects; comparing, by the at least one processor, the extracted one or more visual features of each of the plurality of images with the visual model data associated with the plurality of known objects; determining, by the at least one processor, a descriptive measure for each of the plurality of images based on the comparison of the extracted one or more visual features with the visual model data; and displaying on a display device at least one of the plurality of images dependent on the determined descriptive measures. Comparing the extracted one or more visual features of each of the plurality of images with the visual model data associated with the plurality of known objects may include identifying matches between the extracted visual features and the visual model data associated with the plurality of known objects, and determining a descriptive measure may include determining a descriptive measure for each of the plurality of images based on the number of identified matches. Displaying on a display device at least one of the plurality of images dependent on the determined descriptive measures may include first displaying one of the plurality of images determined to have the highest number of identified matches. Determining a descriptive measure may include determining a descriptive measure ranking for each of the plurality of images based on the number of identified matches, and displaying on a display device at least one of the plurality of images may include sequentially displaying at least two of the plurality of images in an order dependent on the respective ranking of each of the at least two of the plurality of images. Extracting one or more visual features from each of the plurality of images may include extracting one or more geometric point, one or more scale-invariant features, one or more scale-invariant feature transform features, or one or more color features from each of the plurality of images. Extracting one or more visual features from each of the plurality of images may include extracting one or more color features, and determining a descriptive measure for each of the plurality of images may include evaluating a quantity of different colors extracted from each of the plurality of images.

The method may further include logically associating, in at least one processor-readable medium, the exception object with one of the known objects; and automatically combining at least some of the visual features extracted from the plurality of images of the exception object with the visual model data for the one of the known objects to update the visual model data.

The method may further include receiving, by the at least one processor, identification data for the exception object obtained by an operator via a machine-readable symbol reader operatively coupled to the at least one processor.

The method may further include logically associating, in at least one processor-readable medium, the exception object with one of the known objects; and automatically revising the visual model data for the one of the known objects to include at least some of the extracted visual features of at least one of the plurality of images of the exception object. Extracting one or more visual features from each of the plurality of images may include transforming each of the plurality of images into a collection of feature descriptors, each of which is invariant to at least one of image translation, scaling, and rotation. Comparing the extracted one or more visual features of each of the plurality of visual images with visual model data stored in a database may include determining whether a logo is present or absent in each of the plurality of images, and determining a descriptive measure for each of the plurality of images may include determining a descriptive measure for each of the plurality of images based on the determined presence or absence of a logo in each of the plurality of images.

The method may further include positioning a plurality of image capture devices proximate the automated machine-readable symbol reader, each of the plurality of image capture devices directed toward a different one of a plurality of views; and activating each of the plurality of image capture devices to capture the plurality of images at the plurality of views. Determining a descriptive measure for each of the plurality of images may include determining, for each of the plurality of images, a descriptive measure indicative of a likelihood that an operator will identify the exception object by viewing the image. Displaying on a display device at least one of the plurality of images dependent on the determined descriptive measures may include first displaying one of the plurality of images determined to have the highest likelihood that an operator will identify the exception object by viewing the image. Displaying on a display device at least one of the plurality of images dependent on the determined descriptive measures may include sequentially displaying on a display device two or more of the plurality of images in an order dependent on the determined descriptive measures. Sequentially displaying on a display device two or more of the plurality of images may include autonomously, and without user intervention, sequentially displaying on the display device two or more of the plurality of images.

An automated machine-readable symbol reader system may be summarized as including a machine-readable symbol reader that reads machine-readable symbols associated with objects transported through a view volume; an exception identification subsystem that detects an exception object that has been transported into or through the view volume without being successfully identified by the machine-readable symbol reader; an exception handling subsystem that includes: a display device; a database of stored visual features data of known objects; at least one image capture device that obtains a plurality of images of the exception object; and at least one processor operatively coupled to the display device, the at least one database and the at least one image capture device, the at least one processor: extracts a plurality of visual features from each of the plurality of images of the exception object; identifies matches between the extracted visual features and the stored visual features data of known objects; determines a descriptive measure for each of the plurality of images based on the number of identified matches; and causes at least one of the plurality of images of the exception object to be displayed on the display device based on the determined descriptive measures.

The exception handling subsystem may further include a machine-readable symbol reader that reads a machine-readable symbol of the exception object to resolve an exception associated with the exception object. The display device may be a handheld display device.

The automated machine-readable symbol reader system may further include a conveyor subsystem that transports the object into and through the view volume. The at least one image capture device may include a plurality of image capture devices positioned along the conveyor subsystem at different locations to provide different fields of view. The at least one processor may causes the display device to first display one of the plurality of images determined to have the highest number of identified matches. The at least one processor may determine a descriptive measure ranking for each of the plurality of images based on the number of identified matches; and may cause the display device to sequentially display at least two of the plurality of images in an order dependent on the respective ranking of each of the at least two of the plurality of images. The at least one processor may extract one or more geometric point features, one or more scale-invariant features, or one or more color features from each of the plurality of images. The at least one processor may logically associate, in at least one processor-readable medium, the exception object with one of the known objects; and may automatically combine at least some of the visual features extracted from the plurality of images of the exception object with the visual features data for the one of the known objects to update the visual features data for the one of the known objects.

The automated machine-readable symbol reader system of claim 25 may further include a machine-readable symbol reader operatively coupled to the at least one processor, wherein the at least one processor receives identification data for the exception object obtained by an operator via the machine-readable symbol reader. The at least one processor may logically associate, in at least one processor-readable medium, the exception object with one of the known objects; and may automatically revise the visual features data for the one of the known objects to include at least some of the extracted visual features of at least one of the plurality of images of the exception object. The at least one processor may transform each of the plurality of images into a collection of feature descriptors, each of which is invariant to at least one of image translation, scaling, and rotation. The at least one processor may determine whether a logo is present or absent in each of the plurality of images; and may determine a descriptive measure for each of the plurality of images based on the determined presence or absence of a logo in each of the plurality of images. The at least one processor may determine, for each of the plurality of images, a descriptive measure indicative of a likelihood that an operator will identify the exception object by viewing the image. The at least one processor may cause the display device to first display one of the plurality of images determined to have the highest likelihood that an operator will identify the exception object by viewing the image. The at least one processor may cause the display device to sequentially display two or more of the plurality of images in an order dependent on the determined descriptive measures.

A method of operation for an automated machine-readable symbol reader system may be summarized as including moving, via a conveyor, objects along an object path through a view volume of a machine-readable symbol reader; determining, by at least one processor, that an object is being transported through the view volume; attempting, by at least one processor, to identify the object with the machine-readable symbol reader when the object is within the view volume; determining, by at least one processor, an exception to object identification if the machine-readable symbol reader is unsuccessful in identifying the object; capturing a plurality of images of the exception object; determining, by at least one processor, a descriptive measure for at least some of the plurality of captured images of the exception object; and displaying at least one of the plural of captured images of the exception object on a display device dependent on the determined descriptive measures. Determining a descriptive measure for at least some of the plurality of captured images of the exception object may include obtaining, from a database, known scale-invariant features associated with a plurality of known objects; detecting at least one scale-invariant feature for the exception object in at least some of the plurality of images of the exception object; and identifying matches between the detected scale-invariant features and the scale-invariant features of known objects; and determining a descriptive measure for each of the plurality of images based on the number of identified matches.

Determining a descriptive measure for at least some of the plurality of captured images of the exception object may include extracting from the plurality of images visual object recognition features representing a visual property of the exception object; and comparing the visual object recognition features with visual object recognition features of known objects stored in a database.

BRIEF DESCRIPTION OF THE SEVERAL
VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
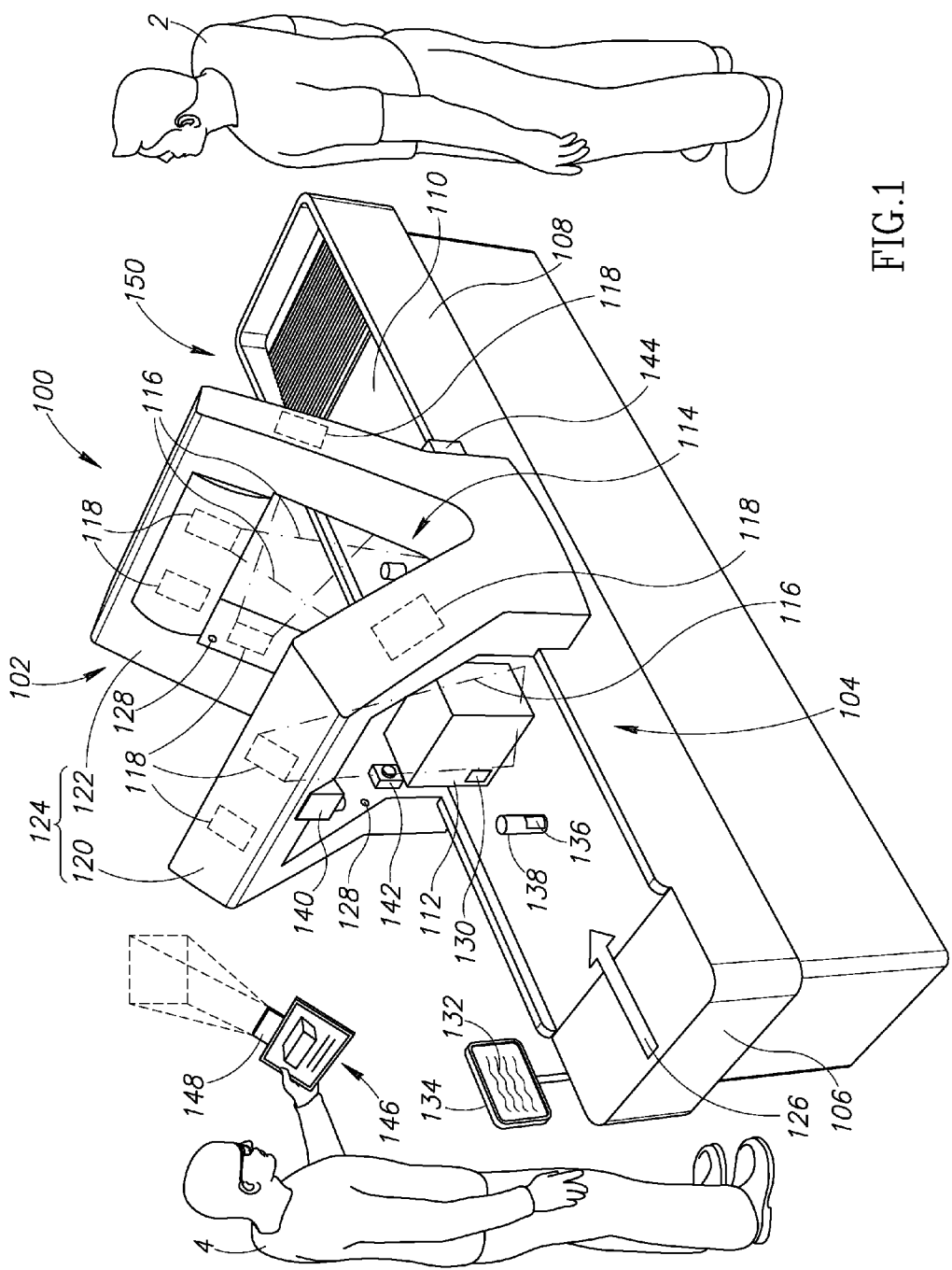
FIG. 1 is a perspective view of an automated machine-readable symbol reader system embodied as an automated checkout system including a conveyor subsystem with some objects loaded on an input conveyor and other objects entering a view volume, as viewed from a customer's point of ingress, according to at least one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the various embodiments have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

In automated scanning or reading applications, the present inventor has recognized that problems can arise due to a misread or a non-read of a machine-readable symbol (also referred to as an exception), slowing the scanning process (e.g., a checkout process, a baggage handling process, etc.). For example, exceptions can result from any of the following: a damaged machine-readable symbol, a machine-readable symbol that is obscured or occluded from view of the machine-readable symbol reader, misalignment of the machine-readable symbol (e.g., misaligned barcode lines), inadvertent movement of the machine-readable symbol away from the view volume (or "read zone"), identifying information for an imaged machine-readable symbol that is unavailable in an inventory database, a mismatch between a machine-readable symbol and other detected visual characteristics of the object (e.g., size, shape, or brand labeling), or other problems causing exceptions. Further, exceptions in automated reader systems often occur because these systems occasionally fail to achieve successful scans on the first pass of an object through a read zone due to the wide variations in product sizes, irregularities of packaging shapes, differing locations of machine-readable symbols, and due to larger objects overshadowing, crowding, or concealing neighboring objects.

Once exceptions are identified, the exceptions may be resolved in a process referred to as assisted exception clearing or handling. Assisted exception clearing generally entails an attendant determining which object in a group of objects is an exception object. For example, as discussed in further detail below, the attendant may be provided with one or more digital images of the exception object captured by the reader system as the exception object moved through a conveyor system. As discussed in detail below, various systems and methods are taught for identifying images of exception objects that are the most descriptive of the exception object so that the attendant can rapidly identify the object. Once the attendant has identified an exception object, the attendant may rescan the object—often with a handheld scanner—to obtain data associated with the machine-readable symbols on packages that cause exceptions. The attendant may also manually input information (e.g., an identification number) to identify the exception object for the system so that the exception may be resolved.

FIG. 1 shows an automated machine-readable symbol reading system 100 (or simply, system 100), as viewed from a point of ingress of a customer 2. The system 100 may include an automated machine-readable symbol reader 102 installed on an automated checkout system 104 including an inlet end 106, an outlet end 108, and a conveyor system 110 for conveying objects 112 (e.g., merchandise) through a three-dimensional volume 114 (referred to as a read zone or view volume) of the reader 102. The view volume 114 is defined by fields of view 116 (only three fields of view depicted for clarity) generated by imagers 118 (or other suitable data capture devices) of the reader 102. The reader 102 has an inlet housing section 120 and an outlet housing section 122 that support the imagers 118 and form corresponding arches 124 over the conveyor system 110. The reader 102 may have any number of imagers desired for a particular application. Details of the reader 102 and the corresponding arches 124 are further described in U.S. patent application Ser. No. 13/357,356, titled, "Tunnel or Portal Scanner and Method of Scanning for Automated Checkout," which is hereby fully incorporated by reference. Although the reader 102 is illustrated with inlet and outlet housing sections 120 and 122, respectively, including an open space between each other, in other embodiments a portal reader may be embodied in an elongate tunnel formed over the conveyor system 110, or a single housing section or arch.

The reader 102, which may take the form of a machine-readable symbol reader, is operable to obtain image, dimensional, and/or positional data representing the objects 112 transported by the conveyor system 110 through the view volume 114. To automatically move the objects 112 along a transport path 126 through the view volume 114, the conveyor system 110 may include one or more suitable types of mechanical transport systems (e.g., belt, pulley, gears, motors, etc.). To track the objects 112, the system 100 may include, for example, conveyor-speed encoders to allow for the calculation of dead-reckoning positional information, and optical detectors 128 on the arches 124 to provide dimensional information of the objects 112. Thus, the system 100 can automatically position and track the objects 112 within and through the view volume 114.

Once the objects 112 are positioned in the view volume 114, the reader 102 reads machine-readable symbols 130 or other identifying indicia (e.g., visually recognizable features) associated with the objects 112 (e.g., printed on a surface of the objects, born by or attached to the objects, etc.). The reader 102 and associated subsystems described below with reference to FIGS. 2 and 3 determine whether identifying indicia are present in the images, decode that information, and identify the tracked objects based on the information. Each of the successfully identified objects is optionally added to an object transaction list 132, which is presented on a display device 134, for example.

In a successful identification operation, the reader 102 reads a machine-readable symbol and confidently associates it to one known object. For example, the reader 102 reads a machine-readable symbol 136 and associates it with a canister 138. The dimensions and position of the canister 138 may be detected so that the canister may be tracked while being transported through the view volume 114, thereby producing a single identification and corresponding entry on the transaction list 132. Accordingly, in a successful read, the canister 138 does not have other machine-readable symbols associated with it, or any other problems that would otherwise cause an exception. For example, one type of exception, called a no-code exception, is an event characterized by the system 100 tracking an object while it is transported through the view volume 114, but no machine-readable symbol is read by the machine-readable symbol reader 102. Another type of exception, called a no-object or phantom-read exception, is characterized by an event in which a machine-readable symbol is read, but the system 100 does not detect that an object has passed through the view volume 114.

The system 100 also includes an exception handling subsystem (see FIG. 2) comprising a top exception object image capture device 140, a left side exception object image capture device 142, a right side exception object image capture device 144, and a display device 146. In some embodiments, the one or more exception object image capture devices 140, 142, and 144 may be the same devices or the same type of devices as the imagers 118. In other embodiments, the one or more exception object image capture devices 140, 142, and 144 are separate and distinct from the imagers 118. In some embodiments, the display device 146 may be a portable/mobile handheld device. In these embodiments, an attendant 4, who may concurrently attend to multiple reader systems (e.g., checkout stations), may move freely with the display device 146. Though the display device 146 may be wired/corded, it is preferably wireless to provide maximized (untethered) mobility. The display device 146 may optionally have a reader 148 for capturing data from the exception objects. Examples of such display devices include laser or imaging handheld scanners with built in displays, mobile computers, cell phones, cell phones with image capture capability (e.g., smart phones), computer tablets, or touch screen computers.

The exception handling subsystem may include an exception handling area or station 150 which may be located proximal the outlet housing section 122, downstream along the transport path 126 of the conveyor system 110 at the outlet end 108 (e.g., a bagging area). The exception handling station 150 may receive objects from the machine-readable symbol reader 102. Thus, an attendant notified of an exception can readily observe an exception object and subsequently clear the exception. An overview of an exception handling subsystem is described below with reference to FIGS. 2 and 3. In some embodiments, one or more exception handling subsystems (also referred to as processing stations or systems) may be located remotely from the reader 102.

Figure 2:
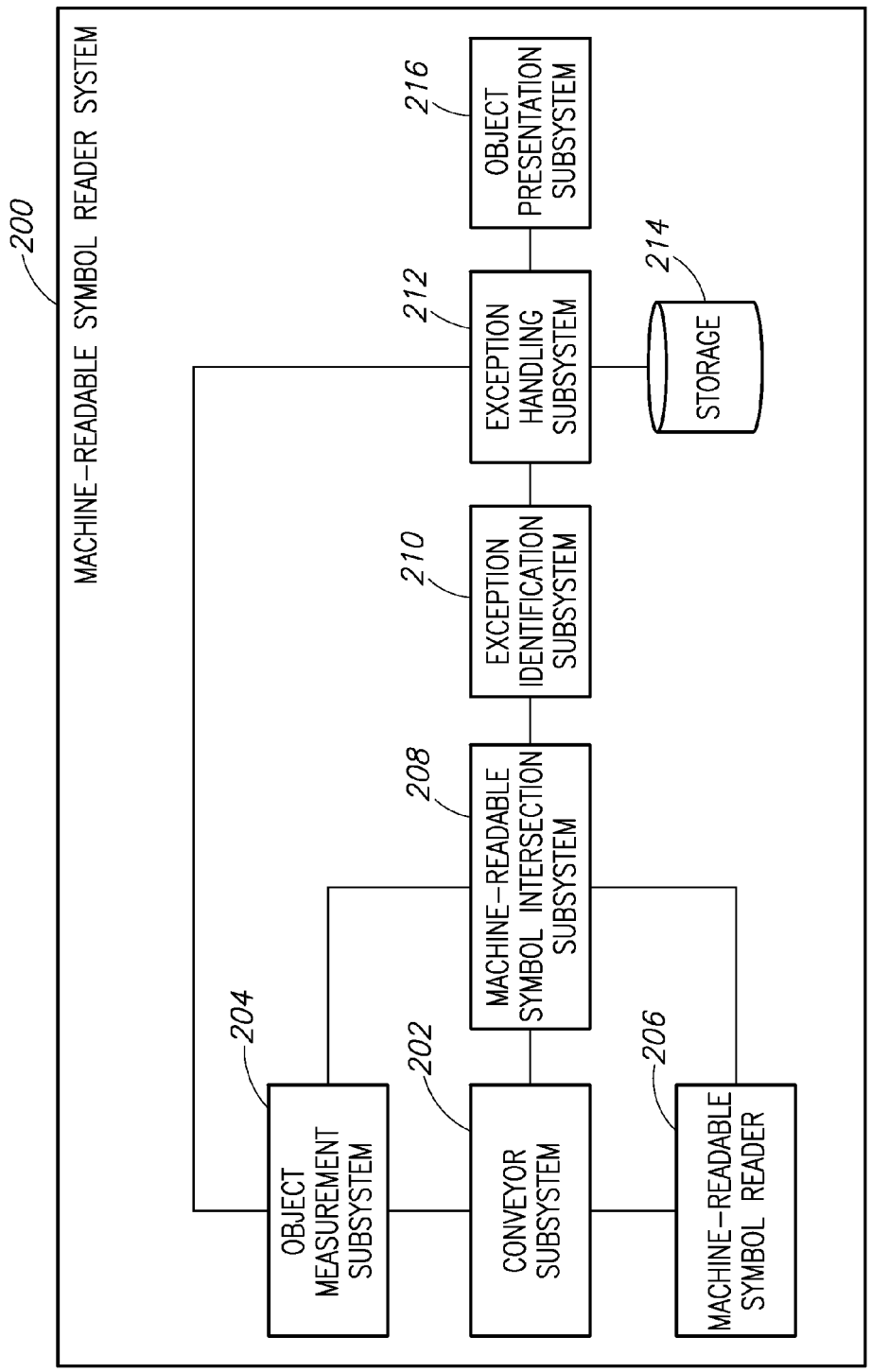
FIG. 2 is a block diagram of an automated machine-readable symbol reader system, according to at least one illustrated embodiment.

FIG. 2 shows an automated machine-readable symbol reader system 200 (or simply, system 200), according to one embodiment. The system 200 may be similar or identical to the system 100 of FIG. 1. The system 200 and its associated subsystems may include decoders (e.g., software algorithms, hardware constructs) to decode various types of identifying indicia that include different types of machine-readable symbols, such as one-dimensional (e.g., linear) codes (e.g., UPC, Codabar, Code 25, Code 39, Code 93, Code 128, Code 11, EAN8, EAN13, Plessey, POSTNET), stacked linear codes (e.g., GS1 Databar, PDF417), and two-dimensional (e.g., matrix) codes (e.g., Aztec Code, Maxicode, QR Code, high-capacity color barcode, data matrix). In some embodiments, the identifying indicia may include visual recognition features, such as geometric point features or other scale-invariant feature transformation (SIFT) features.

To obtain dimensional information from objects (see e.g., the objects 112 of FIG. 1) that are transported by a conveyor subsystem 202, such as conveyor system 110 of FIG. 1, the system 200 may include an object measurement subsystem 204 (see e.g., the optical detectors 128, of FIG. 1). The object measurement subsystem 204 may generate volumetric-model or dimensional data that represent objects as three-dimensional models. The three-dimensional models are used to track each object as it is transported by the conveyor subsystem 202 through a view volume of a machine-readable symbol reader 206.

The machine-readable symbol reader 206 may also be operable to generate projection data for machine-readable symbols represented in the images the machine-readable symbol reader captures. The projection data represent back projection rays that project into the view volume of the machine-readable symbol reader 206. These back projection rays are associated with locations of the representations of the machine-readable symbols in the images, and facilitate association of tracked objects with a machine-readable symbol. For example, the system 200 may include a machine-readable symbol intersection subsystem 208 that receives the model data from the object measurement subsystem 204 and the projection data from machine-readable symbol reader 206. The machine-readable symbol intersection subsystem 208 uses the received information to determine whether the back projection rays generated for decoded machine-readable symbols intersect with the three-dimensional models, for purposes of identifying exceptions.

The system 200 may include an exception identification subsystem 210 that communicates with the machine-readable symbol intersection subsystem 208. The exception identification subsystem 210 determines whether machine-readable symbols read by the machine-readable symbol reader 206 are associated with three-dimensional models generated by the object measurement subsystem 204. In one example, the exception identification subsystem 210 determines that the machine-readable symbols are associated with the three-dimensional models based on intersection determinations made by the machine-readable symbol intersection subsystem 208. From the associations (or lack of associations) of the machine-readable symbols and three-dimensional models, the exception identification subsystem 210 may determine whether exceptions occur. For example, if an object passes through the view volume of the machine-readable symbol reader 206 and the object measurement subsystem 204 generates a three-dimensional model of the object, but no machine-readable symbol is associated with the three dimensional model (e.g., no back projection ray of a machine-readable symbol intersects the three-dimensional model), the exception identification subsystem 210 identifies this event as a no-code exception. The exception identification subsystem 210 is also operable to classify and categorize exceptions by types and subtypes and to generate exception category identification information indicative of the exceptions' types and/or subtypes.

The system 200 may include an exception handling subsystem 212 in communication with the exception identification system 210. The exception handling subsystem 212 autonomously determines in what manner to handle or resolve an exception identified by exception identification subsystem 210 based on the exception's type. To this end, the exception category identification information generated by the exception identification subsystem 210 is communicated to the exception handling system 212. The exception handling subsystem 212 is operable to determine that an exception should be resolved in one of multiple ways. For example, the exception handling subsystem 212 may determine that an exception is to be autonomously resolved (e.g., ignoring the exception) or manually resolved by an operator. The exception handling subsystem 212 may communicate with a processor-readable medium or storage device 214 that stores various types of information associated with exceptions, including images of exception objects.

Figure 6A:
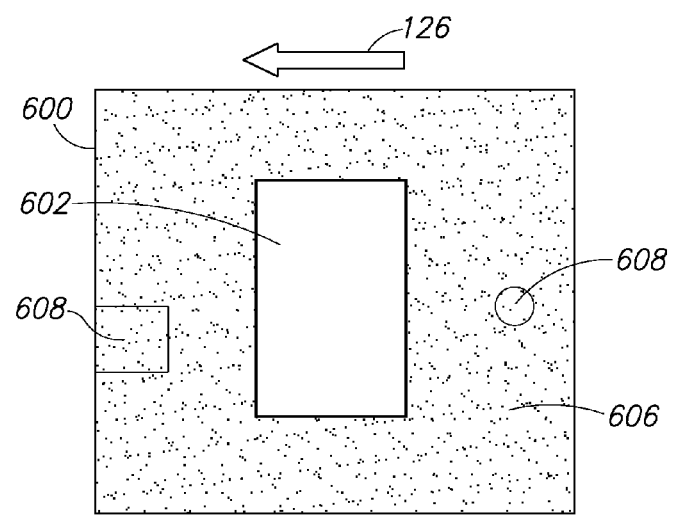
FIG. 6A is a rendering of a first image acquired by a first image capture device of an object presentation subsystem showing a top, non-descriptive view of the exception object, according to at least one illustrated embodiment.
Figure 6B:
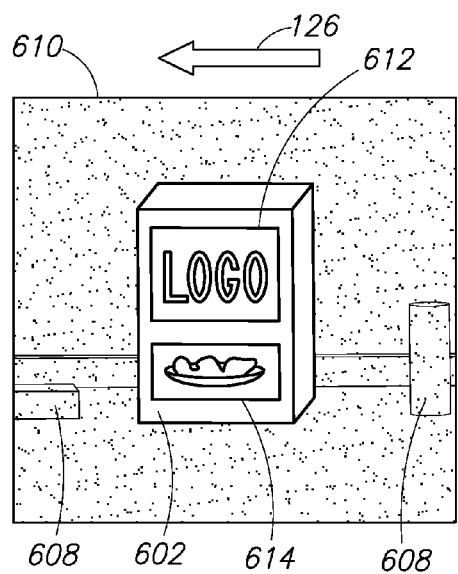
FIG. 6B is a rendering of a second image acquired by a second image capture device of an object presentation subsystem showing a front, descriptive view of the exception object of FIG. 6A, according to at least one illustrated embodiment.
Figure 6C:
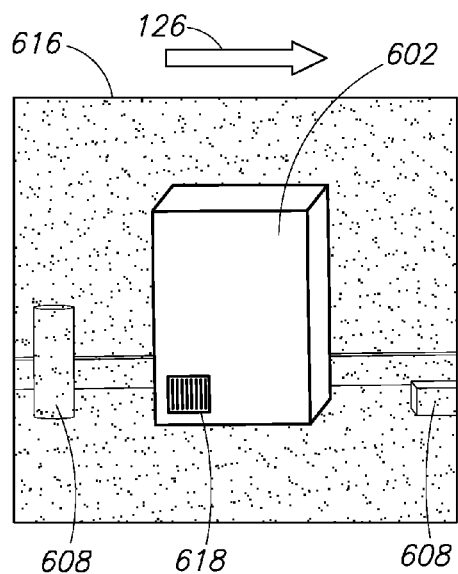
FIG. 6C is a rendering of a third image acquired by a third image capture device of an object presentation subsystem showing a rear, non-descriptive view of the exception object of FIG. 6A, according to at least one illustrated embodiment.

The system 200 may also include an object presentation subsystem 216 that is operable to generate image data corresponding to visual representations of exceptions to enable an operator to readily identify which objects transported through the view volume have associated exceptions. The image data generated by the object presentation subsystem 216 are communicated to a display device, such as the display device 146 (FIG. 1), which displays the visual representations of the exceptions. Example renderings of annotated image data are shown in FIGS. 6A-6C, discussed below.

The system 200 and associated subsystems may include computing devices, such as one or more processors, and associated software or hardware constructs, and/or one or more processor-readable medium to carry out certain functions and methods. The computing devices may be embodied in a single central processing unit, or may be distributed such that a subsystem has its own dedicated processor. Moreover, some embodiments of subsystems may be provided as a computer program product including nontransitory processor-readable medium having stored thereon instructions that may be used to program a computer (or other electronic device) to perform processes or methods described herein. The nontransitory processor-readable medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of machine-readable media suitable for storing electronic instructions.

Figure 3:
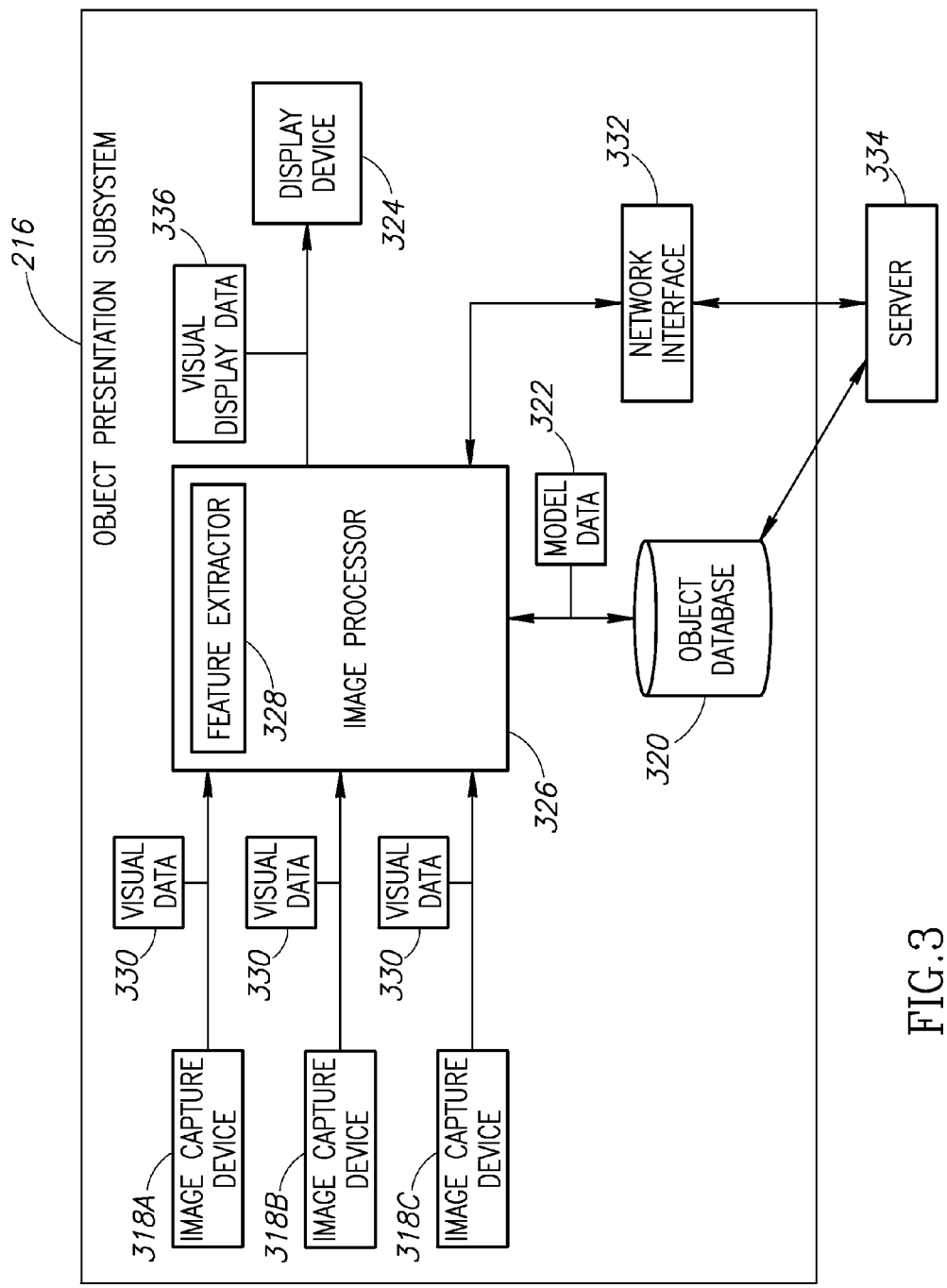
FIG. 3 is a block diagram of an object presentation subsystem of the automated machine-readable symbol reader system of FIG. 2, according to at least illustrated one embodiment.

FIG. 3 shows the object presentation subsystem 216 of the system 200 of FIG. 2 in further detail, according to at least one exemplary embodiment. The object presentation subsystem 216 includes one or more image capture devices 318A-C (generally, image capture devices 318). The image capture devices 318 may be similar or identical to exception object image capture devices 140, 142, and 144 of FIG. 1. The object presentation subsystem 216 also includes an object database 320 of visual model data and/or image data stored in nontransitory processor-readable media, a display device 324 (e.g., the display device 146 of FIG. 1), and an image processor 326 operatively coupled to the object database, the image capture devices, and the display device. A feature extractor 328 may be implemented by the image processor 326, for example, using instructions stored on a nontransitory processor-readable medium.

The image capture devices 318A-C obtain images of an exception object and transmit visual data 330 to the feature extractor 328 which selects and processes at least a subset of those images. In some embodiments, the feature extractor 328 extracts geometric point features such as scale-invariant feature transform (SIFT) features, which is discussed in more detail below with reference to FIGS. 7 and 8. The extracted features generally consist of feature descriptors with which the image processor 326 can at least partially recognize the exception object or one or more properties of the exception object. In particular, the image processor 326 may extract visual features from the images of the exception object, and query the object database 320 to compare the visual features extracted from the images of the exception object with the visual features of known objects in the object database. As discussed further below, this method may be used to determine which one(s) of the plurality of images are relatively descriptive of the exception object so that only the most descriptive images may be displayed to an operator to allow for rapid resolution of the exception. In some embodiments, the operator may be provided with multiple images that are displayed in order from most descriptive to least descriptive, which may allow the operator to identify the exception object more rapidly than if the operator was only provided with a single image or provided with multiple randomly ordered images.

The object presentation subsystem 216 may be implemented in a variety of ways, such as by dedicated hardware, by software executed by a processor, by firmware and/or processor-readable medium executed by a processor, or by a combination of both hardware and software. Also, for simplicity, only three image capture devices 318 are shown in FIG. 3. However, it should be apparent from these teachings that any number of image capture devices may be used without deviating from the spirit and scope of the present disclosure.

The image capture devices 318 may capture images of exception objects at various fields of view and send visual data to the image processor, which may process the visual data 330. The image capture devices 318 may communicate directly or indirectly with the image processor 326 via an appropriate interface, such as a direct connection or a networked connection. This interface may be hard wired or wireless. Examples of interface standards that may be used include, but are not limited to, Ethernet, IEEE 802.11, Bluetooth, Universal Serial Bus, FireWire, S-Video, NTSC composite, frame grabber, and the like.

The image processor 326 may analyze the visual data 330 provided by the image capture devices 318 and identify visual features of the visual data. In one example, the features may be identified using an object recognition process that identifies visual features of an image. In another embodiment, the visual features may correspond to scale-invariant features. Scale-invariant feature transformation (SIFT) methods are discussed in detail below with reference to FIGS. 7 and 8.

The image processor 326 may be operatively coupled with a network communication interface device 332 such as a network interface card, a modem, infrared (IR) port, or other network connection device suitable for connecting to a network. The image processor 326 may be connected to a server 334 or other computing system through a network such as a local area network or a wide area network (e.g., Internet), such that information, including information about exception objects and known objects, may be accessed from the image processor 326. In some embodiments, the image processor 326 accesses the object database 320 at least partially through the server 334. The information may be stored on a central computer system, such as a network fileserver, a mainframe, a secure Internet site, the cloud, or the like.

In some embodiments, the image processor 326 may be connected to the server 334, which may provide the database information stored in the object database 320 to the image processor. When the object presentation subsystem 216 operates in a "training" mode, the server 334 may store all or at least part of the analyzed visual data, such as features descriptors and coordinates associated with the identified features of known objects, along with other relevant information in the object database 320.

It will be understood that during system training, it may be convenient to use one or more image capture devices that are not connected to a machine-readable symbol reader system. For example, training images may be captured in a photography studio or on a "workbench," which can result in higher-quality training images and less physical strain on a human system trainer. In one embodiment, the features of the training images may be captured and stored in the object database 320. A system training mode is described in further detail below.

When the object presentation subsystem 200 operates in an "operation" mode, the image processor 326 may compare the visual features of images captured by the exception object image capture devices 318 with database information or model data 322 that may be descriptive of a plurality of known objects stored in the object database 320. Examples of appropriate match data and matching methods are discussed in detail below with reference to FIGS. 7 and 8. In the case where the object database 320 is accessed through the server 334, the server may provide the image processor 326 with an updated, or synchronized copy of the object database at regular intervals, such as once per hour or once per day, or when an update is requested by the image processor or triggered by a human user or an automated triggering event.

The feature extractor 328 may be implemented in software and/or dedicated hardware. The feature extractor 328 may also send visual display data 336 to the display device 324 for displaying the visual display data. In some embodiments, the feature extractor 328 may analyze the visual data 330 to extract features and send the analyzed visual data to the server 334 that may subsequently compare the analyzed visual data with visual model data 322 for known objects. As a consequence, the server 334 may send results data to the display device 324 (e.g., via the image processor or another suitable interface).

It will be understood by one of ordinary skill in the art that a database may be implemented on an addressable storage medium and may be implemented using a variety of different types of addressable storage mediums. For example, the object database 320 may be entirely contained in a single device or may be spread over several devices, computers, or servers in a network. The object database 320 may be implemented in such devices as memory chips, hard drives, optical drives, and the like. Though the database 320 may have the form of a relational database, the database may also be, by way of example, an object-oriented database, a hierarchical database, a lightweight directory access protocol (LDAP) directory, an object-oriented-relational database, and the like. The database 320 may conform to any database standard, or may even conform to a non-standard private specification.

Figure 4:
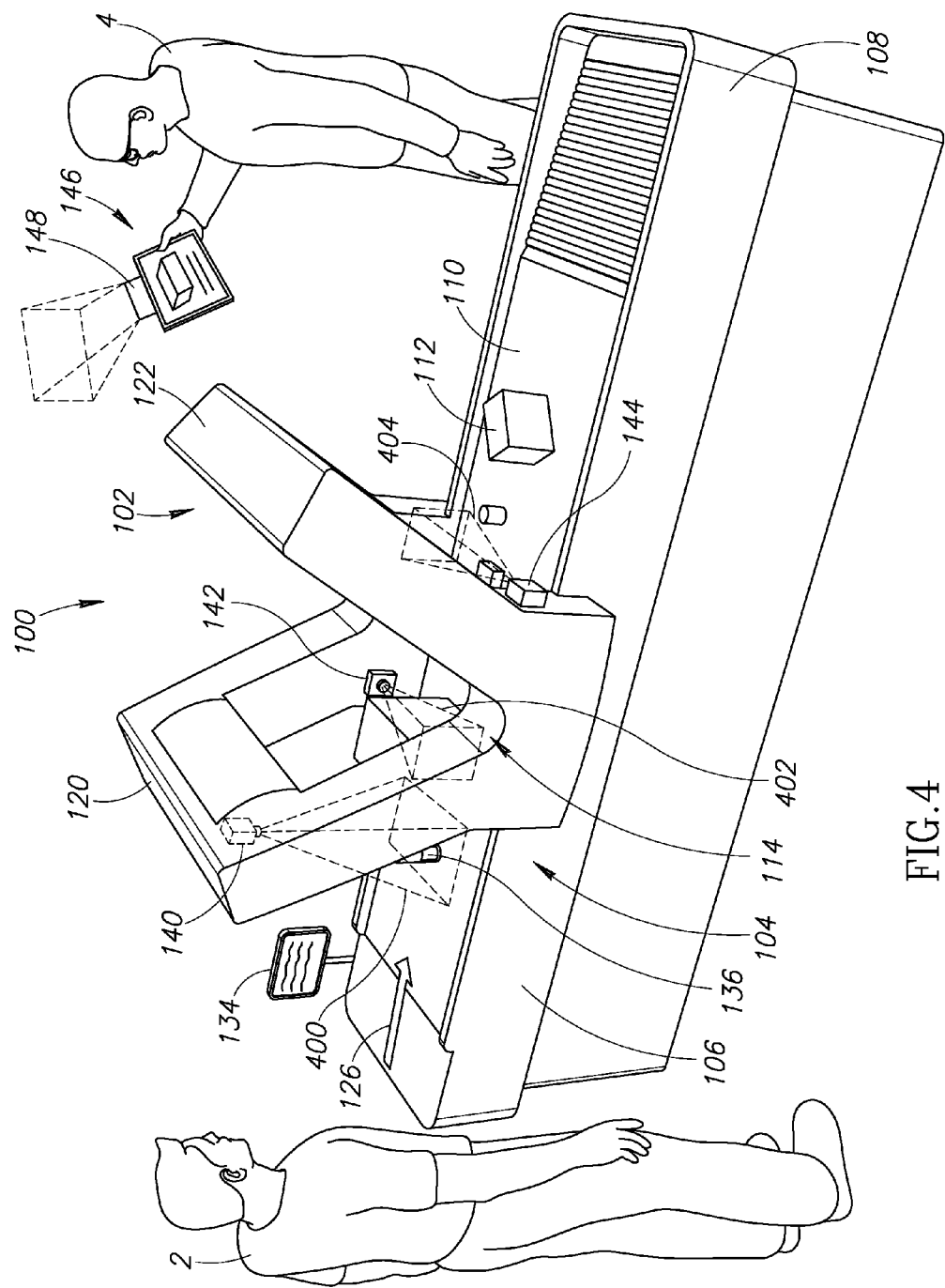
FIG. 4 is a perspective view of the automated checkout system of FIG. 1 as viewed from a customer's point of egress, illustrating a plurality of image capture devices that obtain a plurality of images of an exception object having an associated exception, according to at least one illustrated embodiment.

FIG. 4 shows the system 100, as viewed from a point of egress of the customer 2. The top exception object image capture device or imager 140 obtains a top view image (see, e.g., image 600 of FIG. 6A) of an object having an associated exception. As shown in FIG. 4, the top imager 140 is located at the inlet housing section 120 of the machine-readable symbol reader 102, and it is positioned to produce a field of view 400 that encompasses objects as they enter the view volume 114. As exception objects enter a field of view 400, the imager 140 receives a signal to acquire an image (see FIG. 6A), which represents one or more exception objects. The left exception object image capture device or imager 142 obtains a left-side view image (see, e.g., image 610 of FIG. 6B) of an object having an associated exception. The left exception object image capture device 142 is located at a left side of the inlet housing section 120 of the machine-readable symbol reader 102. As exception objects enter a field of view 402, the left-side imager 142 receives a signal to acquire an image (FIG. 6B), which represents one or more exception objects. The right exception object image capture device or imager 144 obtains a right-side view image (see, e.g., image 616 of FIG. 6C) of an object having an associated exception. The right exception object image capture device 144 is located at a right side of the exit housing section 122 of the machine-readable symbol reader 102. As exception objects enter a field of view 404, the right-side imager 144 receives a signal to acquire an image (FIG. 6C), which represents one or more exception objects. An image processor (e.g., similar or identical to the image processor 326 of FIG. 3) included in the system 100 processes the images to extract visual recognition features (e.g., SIFT features) from the images, which are used to determine which images to display to an operator so that the operator may identify the exception object and clear the exception, as described below. The images may also include video data, and they may be presented on the display device 146 viewable by the attendant 4 and/or the display device 134 viewable by the customer 2.

Once the images are obtained, the image processor (which may be part of the reader 102, or located remotely), extracts visual recognition features from the images obtained by the imagers 140, 142, and 144. The processor compares the sets of features to determine whether the features match features of known objects and thereby indicate that the exception object may be identified as a known object. In some embodiments, a match of visual recognition features is determined when a sufficient number of visual recognition features in captured image data are the same or are similar to visual recognition features in the object database of visual features of known objects, or are arranged in a similar geometric pattern in two different images.

Once an exception is identified by the exception identification subsystem 210 (FIG. 2), the exception handling subsystem 212 may determine that a visual indication of the exception is to be generated to assist an operator in identifying the object associated with the exception. When a visual indication is to be generated, exception handling subsystem 212 calls the object presentation subsystem 216 to create the visual indication. The object presentation subsystem 216 receives image data from one or more exception object image capture devices, such as one of the exception object image capture devices 140, 142, and 144 positioned on the reader 102 as shown in FIGS. 1 and 4. Exception object image capture devices preferably include color imagers to produce color images of view volumes. One or more artificial illumination sources (e.g., incandescent light source, fluorescent light source, LEDs, etc.) may be positioned near the exception object image capture devices and illuminate the object when the exception object image capture devices capture images of the exception objects.

Figure 5:
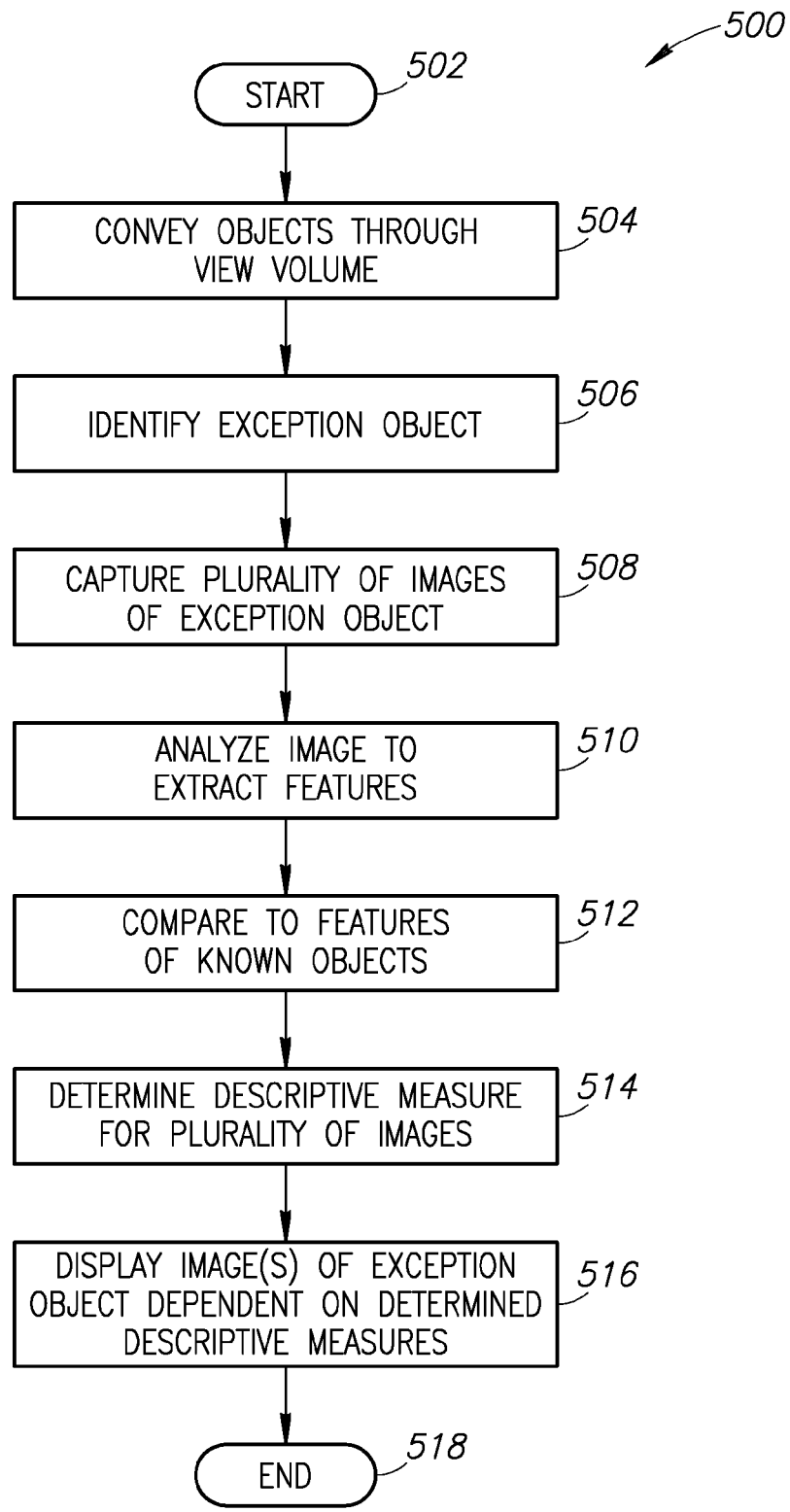
FIG. 5 is a flow diagram showing a method of handling exceptions in an automated machine-readable symbol reader system environment, according to at least one illustrated embodiment.

FIG. 5 shows a process 500 for recognizing and identifying objects in accordance with one or more embodiments. It will be appreciated by those of the ordinary skill that the illustrated process may be modified in a variety of ways without departing from the spirit and scope of the present invention. For example, in other embodiments, various portions of the illustrated process may be combined, rearranged in an alternate sequence, removed, and the like. In addition, it should be noted that the process may be performed in a variety of ways, such as by software or firmware executed by one or more processors, by dedicated hardware, and the like.

At the start of the process 500 illustrated in FIG. 5, a machine-readable symbol reader system, such as the systems 100 and 200 of FIGS. 1 and 2, respectively, has already been trained or programmed to recognize objects or features of objects.

The process may begin at 502. At 504, objects may be conveyed or transported through a view volume of a machine-readable symbol reader configured to acquire identification information of a successfully identified object transported through the view volume. As described above, the objects are transported via the conveyor system through the view volume of the reader. The reader acquires images of machine-readable symbols borne by the objects, and decodes the machine-readable symbols during a successful data read operation.

At 506, an exception for an unidentified object transported through the view volume is identified. For example, the exception identification subsystem 210 (FIG. 2) identifies exceptions for various situations—including for no-code or phantom-read situations—and the exception is associated with an exception object.

At 508, exception object image capture devices may capture a plurality of images of an object to produce visual data. At 510, a processor (e.g., a microprocessor, DSP, GPU) may analyze the visual data acquired at 508 to extract visual features. As mentioned above, the process of analyzing the visual data may be performed by an image processor, a feature extractor, a server 274, or the like. A variety of visual recognition techniques may be used, and it will be understood by one of ordinary skill in the art that an appropriate visual recognition technique may depend on a variety of factors, such as the image capture devices used and/or the visual features used. In one embodiment, the visual features may be identified using an object recognition process that can identify visual features. In one example, the visual features may correspond to SIFT features.

At 510, sets of visual recognition features may be extracted from the visual data. The sets of visual features are, for example, sets of geometric point features, but other visual recognition features are possible. The features are extracted using the image processor or another suitable computing device configured as a feature extractor. In some embodiments, the feature extractor extracts from each of the images (e.g., images 600, 610, and 616 of FIGS. 6A-6C) geometric point features that may include one or more of different types of features such as, but not limited to, scale-invariant feature transformation (SIFT) features; speeded up robust features (SURF); gradient location and orientation histogram (GLOH) features; DAISY features; or any other types of features that encode the local appearance of the exception object (e.g., features that produce similar results irrespective of how the image of the exception object was captured, irrespective of variations in illumination, scale, position and orientation).

The feature extractor produces for each of the images, feature data representing a feature model of the exception object. A feature model corresponds to a collection of features that are derived from the images. Each feature model may include different types of information associated with a feature and with the exception object, such as an identifier to identify that the feature is associated with a specific image or object; the X and Y position coordinates, scale, and orientation of the feature, and a multi-dimensional feature descriptor of each feature.

At 512, the identified visual features may be compared to visual features of known objects stored in a database, such as the object database 320 (FIG. 3). In one embodiment, the comparison may be done using the SIFT method, for example. The process may find one match, may find multiple matches, or may find no matches.

At 514, in some embodiments, if the processor finds multiple matches, it may, based on one or more measures of the quality of the matches, determine a descriptive measure for each of the images captured by the exception object image capture devices. For example, images with higher values of an associated quality measure of matches may be deemed to have higher descriptive measures than images with lower values. A match confidence may be associated with a match, wherein the confidence is a variable that is set by adjusting a parameter with a range, such as 0% to 100%, that relates to the fraction of the features that are recognized as matching between the database of visual data and a particular stored image, or stored set of features.

In some embodiments, the descriptive measure may be based on one or more color features. For example, an image of an exception object with a relatively large number of colors may be deemed more descriptive of the exception object than an image of the exception object with a relatively lower number of colors. In this example, an image with a relatively large number of colors may indicate the image is of a front side of an exception object's packaging which includes product names, logos, or other visually identifying information. An image with a relatively low number of colors may indicate that the image is of a non-descriptive side of an object's packaging, such as the bottom or rear side thereof. The operator may be able to more quickly identify the exception object when viewing the front side of the exception object compared to viewing the bottom or rear side of the exception object.

At 516, the system may display one or more images of the exception object on a display device (e.g., the display device 146 of FIG. 1) dependent on the determined descriptive measures. For example, in some embodiments, the system may display only the image determined to have the highest descriptive measure, since that image is determined to provide the highest likelihood that the operator will be able to identify the exception object after viewing the image. In some embodiments, the several images may be sequentially displayed on the display device, but ordered from most descriptive to least descriptive (e.g., a ranked order). Thus, the operator is provided with the images most likely to facilitate identification first. In some embodiments, several images may be displayed simultaneously in a manner designed for the operator to view the most descriptive images first. For example, several ordered images may be displayed vertically or horizontally on the display device. In some embodiments, multiple ordered images may be displayed sequentially on the display device autonomously without intervention by the operator (e.g., a slide show). In other embodiments, the user may be able to manually cause the display device to display a sequence of ordered images by interacting with an input device of the display device (e.g., a touch screen, a mouse, a keyboard, a stylus, etc.).

In addition to displaying the exception object on a display device of an operator or attendant, in some embodiments, the exception object may be displayed on a display device viewable by a customer, such as the display device 134 of FIG. 1. In some embodiments, the systems and methods described herein may be utilized to display the most descriptive images of objects (exception objects and non-exception objects) to a customer as the objects are transported through the view volume, which allows the customer to view the most descriptive image(s) of the objects as the objects are being purchased.

The process 500 ends at 518. The process 500 may repeat for subsequent objects that are to be identified by the machine-readable symbol reader system (e.g., during a checkout process).

A process for training an automated machine-readable symbol reader system, such as the systems 100 and 200 of FIGS. 1 and 2, respectively, is now described. A processor may receive visual data of an object from an image capture device, such as a camera. As described earlier, it may be convenient, during system training, to use an image capture device that is not connected to a reader system (e.g., a checkout subsystem). For example, training images may be captured in a photography studio or on a "workbench," which may result in higher-quality training images and less physical strain on a human system trainer. In one embodiment, the system may receive electronic data from the manufacturer of the object, where the electronic data may include information associated with the object, such as merchandise specifications and visual images.

The system may receive data associated with the received image that may include, for example, one or more of: the distance between the image capture device and the object of the image at the time of image capture; an object name; a view name; an object identifier (ID); a view identifier (ID); a unique identifier; a text string associated with the object of the image; a name of a computer file (such as a sound clip, a movie clip, or other media file) associated with the image; a price of the object of the image; and the machine-readable symbol associated with the object of the image. The associated data may be manually entered, automatically or autonomously generated or retrieved, or a combination of both. For example, in some embodiments, the operator of the system may input all of the associated data manually. In another embodiment, one or more of the associated data objects, such as the object ID or the view ID, may be generated automatically, such as sequentially, by the system. In another embodiment, one or more of the associated data objects may be generated through another input method. For example, a machine-readable symbol associated with an image may be input to the system using a machine-readable symbol reader.

Several images may be taken at different angles, orientations, or poses with respect to a specific object. In some embodiments, each face of an object that needs to be recognized is captured. In some embodiments, all such faces of a given object may be associated with the same object ID, but associated with different view IDs, for example.

Additionally, if an object that needs to be recognized is relatively malleable and/or deformable, such as a bag of pet food or a bag or potato chips, several images may be taken at different deformations of the object. It may be beneficial to capture a relatively high-resolution image, such as a close up, of the most visually distinctive regions of the object, such as the product logo. It may also be beneficial to capture a relatively high-resolution image of the least malleable portions of the object. In some embodiments, all such deformations and close-ups captured of a given object may be associated with the same object ID, but associated with different view IDs.

The system may store the image received and the associated data collected in a database, such as the object database 320 of FIG. 3.

The system may perform a training subprocess on the captured image or images. In some embodiments, the system may scan the database that contains the stored images, select images that have not been trained, and run the training subroutine on the untrained images. For each untrained image, the system may analyze the image, find the features present in the image and save the features in the object database.

In some embodiments, the system may delete the images on which the system was trained. In some embodiments, the matching processes described herein may use the features associated with a trained image and may not use the actual trained image. Advantageously, deleting the trained images may reduce the amount of disk space or memory required to store the object database.

In some embodiments, the system may be trained prior to its initial use. In some embodiments, additional training may be performed periodically or repeatedly. For example, images obtained during operation of the system may be analyzed to improve or update models developed during pre-operational training. The number of training images acquired in different training cycles may vary in a wide range.

FIGS. 6A-6C illustrate images of an exception object 602 captured by the exception object image capture devices 140, 142, and 144 of the system 100 (FIGS. 1 and 4). This example, however, may also be applicable to exception objects captured by the image capture devices 118 of the machine-readable symbol reader 102 if such image capture devices are utilized to capture images of exception objects. In this example, the image 600 depicted in FIG. 6A is a top view of the exception object 602 which also shows objects 608. The top view image 600 may be obtained, for example, by the top exception object image capture device 140 of FIG. 1. The image 610 depicted in FIG. 6B is a left side view of the exception object 602 which also shows the objects 608. The image 610 may be obtained, for example, by the left exception object image capture device 142 of FIG. 1. The left side image 610 shown in FIG. 6B captures a front side of the exception object 602 that includes a logo 612 and a descriptive photo 614. The image 616 depicted in FIG. 6C is a right side view of the exception object 602 which also shows the objects 608. The image 616 may be obtained, for example, by the right exception object image capture device 144 of FIG. 1. The right side image 616 shown in FIG. 6C captures a rear side of the exception object 602 that includes machine-readable symbol 618.

Initially, the field of view, location, and orientation of the exception object image capture devices 140, 142, and 144 (FIG. 1) may be recorded. The image data communicated to the object presentation subsystem 216 (FIGS. 2 and 3) represent one or more images captured by the exception object image capture devices 140, 142, and 144 (or image capture devices 318). The object presentation subsystem also receives model data generated by object measurement subsystem 204 (FIG. 2). The relative positioning of the exception object image capture devices 140, 142, and 144 with that of sensors of the object measurement subsystem 204 may be determined. Based on parameters such as the relative positioning of the image capture devices 140, 142, and 144 and/or other sensors (e.g., sensors 128 of FIG. 1), the time an image is captured by the image capture devices, the time when other sensors measure an object, and conveyor belt speed, the model data is correlated with the image captured by the image capture devices to identify the location of the object 602 in the image.

By knowing where objects are located in the image and which objects have an exception, the object presentation subsystem 216 is able to generate annotated image data representing an annotated image of the scene captured by exception object image capture device 140, 142, and 144. In this example, the object 602 has been determined to be an exception object while objects 608 were properly identified and are therefore not deemed exception objects. Thus, in each of the images 600, 610, and 616, the exception object 602 is visually emphasized (e.g., highlighted while the remainder 606 of the scene is darkened or "grayed out"). Other methods may be utilized to visually emphasize the exception object 602 in an image. For example, in some embodiments the annotated image includes an outline surrounding an exception object that corresponds to a three-dimensional model of the object generated by the object measurement subsystem 204 (FIG. 2). In other words, the three-dimensional model of the object is projected onto the image of the scene captured by one of the exception object image capture devices 140, 142, and 144 to indicate in an intuitive manner that an object has an exception associated with it. In some embodiments, a color-coded outline may be used to highlight an exception object. For example, one color (e.g., red) may be used to indicate that an exception is associated with an object, and outlines of a different color (e.g., green) may be used to indicate objects that do not have exceptions associated with them.

One or more of the annotated image data may be communicated to a display device, such as the display device 146 of FIG. 1, to display the annotated image of the scene. In this example, the left side image 610 of the object 602 shows the logo 612 and the descriptive photo 614 for the exception object, whereas the top image 600 and the right side image 616 are relatively non-descriptive. Using the techniques described herein, the system may determine that the image 610 of FIG. 6B is more descriptive that the images 600 and 616 of FIGS. 6A and 6C, respectively. Based on this determination, the system may only display the image 610 of FIG. 6B to an operator, or may display the image 610 first in a sequence of ordered images displayed on the display device. By displaying the most descriptive image(s) of the exception object 602 first, the operator is able to rapidly identify the exception object so that the exception can be resolved.

Figure 7:
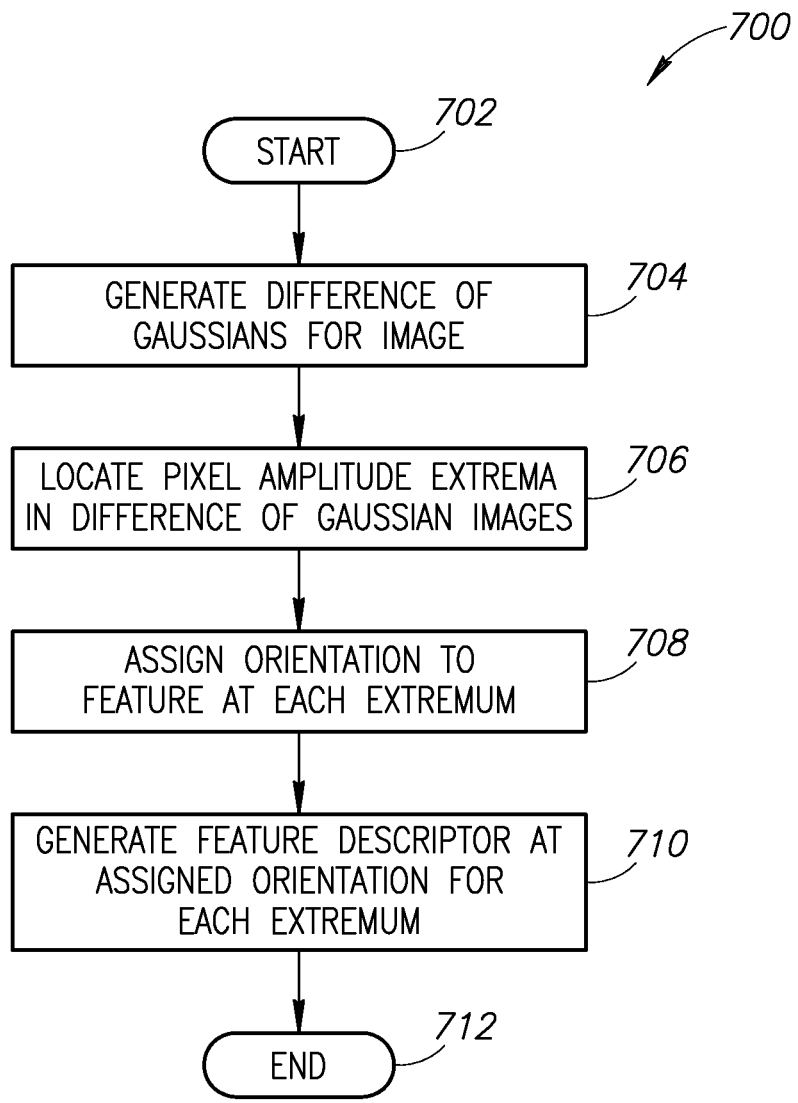
FIG. 7 is a flow diagram of a scale-invariant feature transform (SIFT) methodology, according to at least one illustrated embodiment.

FIG. 7 shows a method 700 of extracting scale-invariant visual features from an image, according to one illustrated embodiment. The method 700 begins at 702. At 704, visual features are extracted from any given image by generating a plurality of Difference-of-Gaussian (DoG) images from the input image. A Difference-of-Gaussian image represents a band-pass filtered image produced by subtracting a first copy of the image blurred with a first Gaussian kernel from a second copy of the image blurred with a second Gaussian kernel. This process is repeated for multiple frequency bands, that is, at different scales, in order to accentuate objects and object features independent of their size and resolution. While image blurring is achieved using a Gaussian convolution kernel of variable width, one skilled in the art will appreciate that the same results may be achieved by using a fixed-width Gaussian of appropriate variance and variable-resolution images produced by down-sampling the original input image.

At 706, each of the DoG images is inspected to identify the pixel extrema including minima and maxima. To be selected, an extremum must possess the highest or lowest pixel intensity among the eight adjacent pixels in the same DoG image as well as the nine adjacent pixels in the two adjacent DoG images having the closest related band-pass filtering, i.e., the adjacent DoG images having the next highest scale and the next lowest scale if present. The identified extrema, which may be referred to herein as image "keypoints," are associated with the center point of visual features. In some embodiments, an improved estimate of the location of each extremum within a DoG image may be determined through interpolation using a 3-dimensional quadratic function, for example, to improve feature matching and stability.

At 708, with each of the visual features localized, the local image properties are used to assign an orientation to each of the keypoints. By consistently assigning each of the features an orientation, different keypoints may be readily identified within different images even where the object with which the features are associated is displaced or rotated within the image. In some embodiments, the orientation is derived from an orientation histogram formed from gradient orientations at all points within a circular window around the keypoint. It may be beneficial to weight the gradient magnitudes with a circularly-symmetric Gaussian weighting function where the gradients are based on non-adjacent pixels in the vicinity of a keypoint. The peak in the orientation histogram, which corresponds to a dominant direction of the gradients local to a keypoint, is assigned to be the feature's orientation.

At 710, with the orientation of each keypoint assigned, the feature extractor generates a feature descriptor to characterize the image data in a region surrounding each identified keypoint at its respective orientation. In some embodiments, the surrounding region within the associated DoG image is subdivided into an M×M array of subfields aligned with the keypoint's assigned orientation. Each subfield in turn is characterized by an orientation histogram having a plurality of bins, each bin representing the sum of the image's gradient magnitudes possessing a direction within a particular angular range and present within the associated subfield. Generating the feature descriptor from the one DoG image in which the inter-scale extrema is located insures that the feature descriptor is largely independent of the scale at which the associated object is depicted in the images being compared. In some embodiments, the feature descriptor includes a 128 byte array corresponding to a 4×4 array of subfields with each subfield including eight bins corresponding to an angular width of 45 degrees. The feature descriptor in some embodiments further includes an identifier of the associated image, the scale of the DoG image in which the associated keypoint was identified, the orientation of the feature, and the geometric location of the keypoint in the associated DoG image.

The process 700 may end at 712. The process of generating DoG images, localizing pixel extrema across the DoG images, assigning an orientation to each of the localized extrema, and generating a feature descriptor for each of the localized extrema may then be repeated for each of the plurality of images received from the one or more exception object image capture devices.

Figure 8:
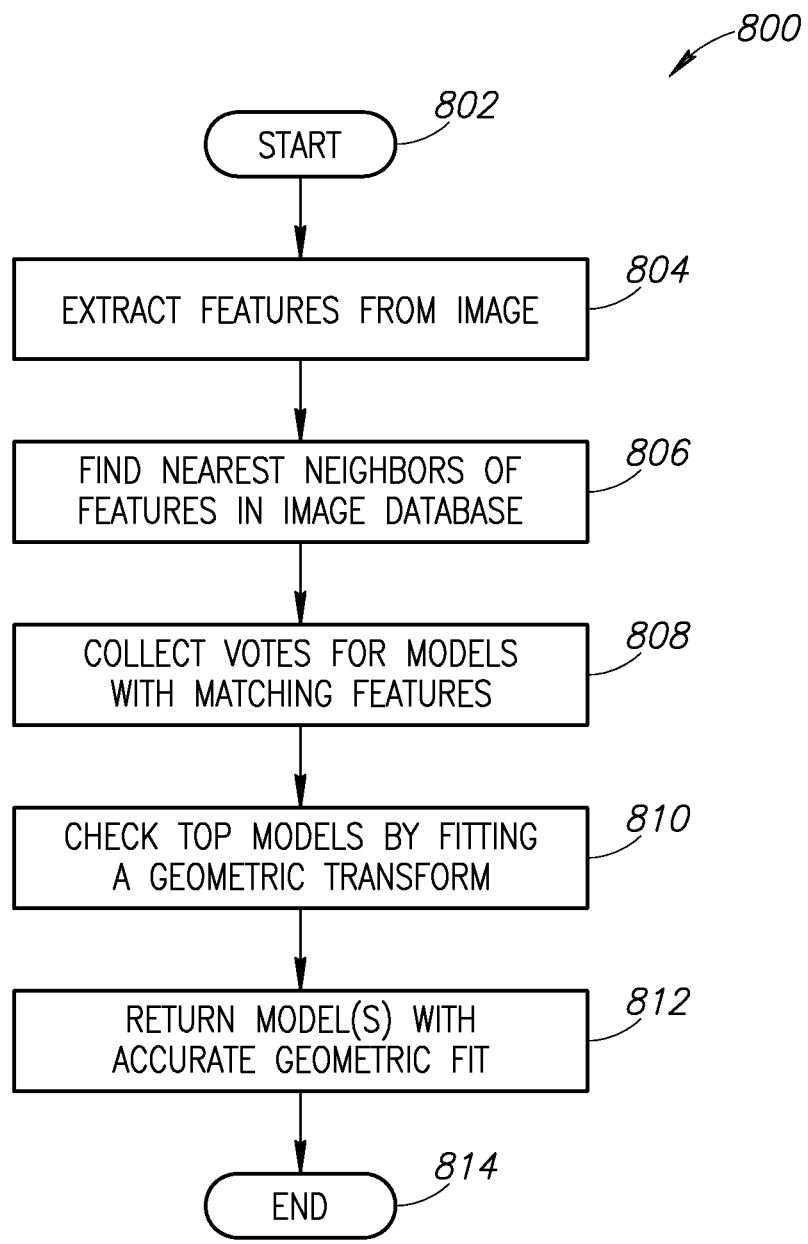
FIG. 8 is a flow diagram of a method of visually recognizing an object of merchandise or other object, according to at least one illustrated embodiment.

FIG. 8 shows a method 800 of recognizing objects given an image and a database of models. The method begins at 802. At 804, feature descriptors are extracted from the image. At 806, each of the extracted feature descriptors of the image is compared to the features in the database to find nearest neighbors. In some embodiments, two features match when the Euclidian distance between their respective SIFT feature descriptors is below some threshold. These matching features, referred to here as nearest neighbors, may be identified in any number of ways including a linear search ("brute force search"). In some embodiments, however, a nearest-neighbor is identified using a best-bin-first search in which the vector components of a feature descriptor are used to search a binary tree composed from each of the feature descriptors of the other images to be searched. Although the best-bin-first search is generally less accurate than the linear search, the best-bin-first search provides substantially the same results with significant computational savings.

At 808, after a nearest-neighbor is identified, a counter associated with the model containing the nearest neighbor may be incremented to effectively enter a "vote" to ascribe similarity between the models with respect to the particular feature. In some embodiments, the voting is performed in a multi-dimensional space where the dimensions are model ID or number, and the relative scale, rotation, and translation of the two matching features. The models that accumulate a number of "votes" in excess of a predetermined threshold are selected for subsequent processing as described below.

At 810, with the features common to a model identified, the image processor determines the geometric consistency between the combinations of matching features. In some embodiments, a combination of features (referred to as "feature patterns") is aligned using an affine transformation, which maps the coordinates of features of one image to the coordinates of the corresponding features in the model. If the feature patterns are associated with the same underlying object, the feature descriptors characterizing the object will geometrically align with small difference in the respective feature coordinates.

The degree to which a model matches (or fails to match) can be quantified in terms of a "residual error" computed for each affine transform comparison. A small error signifies a close alignment between the feature patterns which may be due to the fact that the same underlying object is being depicted in the two images. In contrast, a large error generally indicates that the feature patterns do not align, although common feature descriptors match individually by coincidence. At 812, the one or more models with the smallest residual errors may be returned as the best matches.

The SIFT methodology described above has also been described in U.S. Pat. No. 6,711,293 issued Mar. 23, 2004, which is hereby incorporated by reference herein. The correlation methodology described above is also taught in U.S. Pat. No. 8,068,674, titled, "UPC Substitution Fraud Prevention," which is hereby incorporated by reference herein. Feature comparison and object recognition are also described in U.S. Pat. No. 8,196,822, titled, "Self Checkout with Visual Recognition," which is hereby fully incorporated by reference.

Another embodiment is directed to a system that implements a scale-invariant and rotation-invariant technique referred to as Speeded Up Robust Features (SURF). The SURF technique uses a Hessian matrix composed of box filters that operate on points of the image to determine the location of features as well as the scale of the image data at which the feature is an extremum in scale space. The box filters approximate Gaussian second order derivative filters. An orientation is assigned to the feature based on Gaussian-weighted, Haar-wavelet responses in the horizontal and vertical directions. A square aligned with the assigned orientation is centered about the point for purposes of generating a feature descriptor. Multiple Haar-wavelet responses are generated at multiple points for orthogonal directions in each of 4×4 sub-regions that make up the square. The sum of the wavelet response in each direction, together with the polarity and intensity information derived from the absolute values of the wavelet responses, yields a four-dimensional vector for each sub-region and a 64-length feature descriptor.

There are other feature detectors and feature descriptors that may be employed in combination with the embodiments described herein. Exemplary feature detectors include: the Harris detector which finds corner-like features at a fixed scale; the Harris-Laplace detector which uses a scale-adapted Harris function to localize points in scale-space (it then selects the points for which the Laplacian-of-Gaussian attains a maximum over scale); Hessian-Laplace localizes points in space at the local maxima of the Hessian determinant and in scale at the local maxima of the Laplacian-of-Gaussian; the Harris/Hessian Affine detector, which does an affine adaptation of the Harris/Hessian Laplace detector using the second moment matrix; the Maximally Stable Extremal Regions detector, which finds regions such that pixels inside the MSER have either higher (brighter extremal regions) or lower (dark extremal regions) intensity than all pixels on its outer boundary; the salient region detector, which maximizes the entropy within the region; and edge-based region detector; and various affine-invariant feature detectors known to those skilled in the art.

Exemplary feature descriptors include: shape contexts which computes the distance and orientation histogram of other points relative to the interest point; image moments which generate descriptors by taking various higher order image moments; jet descriptors which generate higher order derivatives at the interest point; gradient location and orientation histogram which uses a histogram of location and orientation of points in a window around the interest point; Gaussian derivatives; moment invariants; complex features; steerable filters; color features, and phase-based local features known to those skilled in the art.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various embodiments described above can be combined to provide further embodiments. To the extent that they are not inconsistent with the specific teachings and definitions herein, all of the U.S. patents, U.S. patent application publications, and U.S. patent applications referred to in this specification and/or listed in the Application Data Sheet are incorporated herein by reference in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation for an automated machine-readable symbol reader system, the method comprising:
receiving a plurality of images of an exception object in at least one processor-readable medium, the exception object having not been successfully identified by a machine-readable symbol reader of the machine-readable symbol reader system;
extracting, by at least one processor, one or more visual features from each of the plurality of received images;

accessing a database of visual model data associated with a plurality of known objects;

comparing, by the at least one processor, the extracted one or more visual features of each of the plurality of images with the visual model data associated with the plurality of known objects;

determining, by the at least one processor, a descriptive measure for each of the plurality of images based on the comparison of the extracted one or more visual features with the visual model data; and sequentially displaying on a display device two or more of the plurality of images in an order dependent on the determined descriptive measures.

2. The method of claim 1 wherein comparing the extracted one or more visual features of each of the plurality of images with the visual model data associated with the plurality of known objects comprises identifying matches between the extracted visual features and the visual model data associated with the plurality of known objects, and determining a descriptive measure comprises determining a descriptive measure for each of the plurality of images based on the number of identified matches.

3. The method of claim 2 wherein sequentially displaying on a display device two or more of the plurality of images in an order dependent on the determined descriptive measures comprises first displaying one of the plurality of images determined to have the highest number of identified matches.

4. The method of claim 1 wherein extracting one or more visual features from each of the plurality of images comprises extracting one or more geometric point, one or more scale-invariant features, one or more scale-invariant feature transform features, or one or more color features from each of the plurality of images.

5. The method of claim 1 wherein extracting one or more visual features from each of the plurality of images comprises extracting one or more color features, and determining a descriptive measure for each of the plurality of images comprises evaluating a quantity of different colors extracted from each of the plurality of images.

6. The method of claim 1, further comprising:
logically associating, in at least one processor-readable medium, the exception object with one of the known objects; and
automatically combining at least some of the visual features extracted from the plurality of images of the exception object with the visual model data for the one of the known objects to update the visual model data.

7. The method of claim 6, further comprising:
receiving, by the at least one processor, identification data for the exception object obtained by an operator via a machine-readable symbol reader operatively coupled to the at least one processor.

8. The method of claim 1, further comprising:
logically associating, in at least one processor-readable medium, the exception object with one of the known objects; and
automatically revising the visual model data for the one of the known objects to include at least some of the extracted visual features of at least one of the plurality of images of the exception object.

9. The method of claim 1 wherein extracting one or more visual features from each of the plurality of images comprises transforming each of the plurality of images into a collection of feature descriptors, each of which is invariant to at least one of image translation, scaling, and rotation.

10. The method of claim 1 wherein comparing the extracted one or more visual features of each of the plurality of visual images with visual model data stored in a database comprises determining whether a logo is present or absent in each of the plurality of images, and determining a descriptive measure for each of the plurality of images comprises determining a descriptive measure for each of the plurality of images based on the determined presence or absence of a logo in each of the plurality of images.

11. The method of claim 1, further comprising:
positioning a plurality of image capture devices proximate the automated machine-readable symbol reader, each of the plurality of image capture devices directed toward a different one of a plurality of views; and
activating each of the plurality of image capture devices to capture the plurality of images at the plurality of views.

12. The method of claim 1 wherein determining a descriptive measure for each of the plurality of images comprises determining, for each of the plurality of images, a descriptive measure indicative of a likelihood that an operator will identify the exception object by viewing the image.

13. The method of claim 12 wherein sequentially displaying on a display device two or more of the plurality of images in an order dependent on the determined descriptive measures comprises first displaying one of the plurality of images determined to have the highest likelihood that an operator will identify the exception object by viewing the image.

14. The method of claim 1 wherein sequentially displaying on a display device two or more of the plurality of images comprises autonomously, and without user intervention, sequentially displaying on the display device two or more of the plurality of images.

15. A method of operation for an automated machine-readable symbol reader system, the method comprising:
receiving a plurality of images of an exception object in at least one processor-readable medium, the exception object having not been successfully identified by a machine-readable symbol reader of the machine-readable symbol reader system;
extracting, by at least one processor, one or more visual features from each of the plurality of received images;
accessing a database of visual model data associated with a plurality of known objects;
identifying matches between the extracted visual features and the visual model data associated with the plurality of known objects;
determining a descriptive measure ranking for each of the plurality of images based on the number of identified matches; and
sequentially displaying on a display device at least two of the plurality of images in an order dependent on the respective ranking of each of the at least two of the plurality of images.

16. An automated machine-readable symbol reader system, comprising:
a machine-readable symbol reader that reads machine-readable symbols associated with objects transported through a view volume;
an exception identification subsystem that detects an exception object that has been transported into or through the view volume without being successfully identified by the machine-readable symbol reader;
an exception handling subsystem that includes:
a display device;
a database of stored visual features data of known objects;
at least one image capture device that obtains a plurality of images of the exception object; and at least one processor operatively coupled to the display device, the at least one database and the at least one image capture device, the at least one processor:

extracts a plurality of visual features from each of the plurality of images of the exception object;

identifies matches between the extracted visual features and the stored visual features data of known objects;

determines a descriptive measure for each of the plurality of images based on the number of identified matches; and causes two or more of the plurality of images of the exception object to be displayed sequentially on the display device in an order dependent on the determined descriptive measures.

17. The automated machine-readable symbol reader system of claim 16 wherein the exception handling subsystem further comprises a machine-readable symbol reader that reads a machine-readable symbol of the exception object to resolve an exception associated with the exception object.

18. The automated machine-readable symbol reader system of claim 16 wherein the display device is a handheld display device.

19. The automated machine-readable symbol reader system of claim 16, further comprising:
a conveyor subsystem that transports the object into and through the view volume.

20. The automated machine-readable symbol reader system of claim 19 wherein the at least one image capture device comprises a plurality of image capture devices positioned along the conveyor subsystem at different locations to provide different fields of view.

21. The automated machine-readable symbol reader system of claim 16 wherein the at least one processor:
causes the display device to first display one of the plurality of images determined to have the highest number of identified matches.

22. The automated machine-readable symbol reader system of claim 21 wherein the at least one processor:
determines a descriptive measure ranking for each of the plurality of images based on the number of identified matches; and
causes the display device to sequentially display at least two of the plurality of images in an order dependent on the respective ranking of each of the at least two of the plurality of images.

23. The automated machine-readable symbol reader system of claim 16 wherein the at least one processor:
extracts one or more geometric point features, one or more scale-invariant features, or one or more color features from each of the plurality of images.

24. The automated machine-readable symbol reader system of claim 16 wherein the at least one processor:
logically associates, in at least one processor-readable medium, the exception object with one of the known objects; and
automatically combines at least some of the visual features extracted from the plurality of images of the exception object with the visual features data for the one of the known objects to update the visual features data for the one of the known objects.

25. The automated machine-readable symbol reader system of claim 24, further comprising:
a machine-readable symbol reader operatively coupled to the at least one processor, wherein the at least one processor receives identification data for the exception object obtained by an operator via the machine-readable symbol reader.

26. The automated machine-readable symbol reader system of claim 16 wherein the at least one processor:
logically associates, in at least one processor-readable medium, the exception object with one of the known objects; and
automatically revises the visual features data for the one of the known objects to include at least some of the extracted visual features of at least one of the plurality of images of the exception object.

27. The automated machine-readable symbol reader system of claim 16 wherein the at least one processor:
transforms each of the plurality of images into a collection of feature descriptors, each of which is invariant to at least one of image translation, scaling, and rotation.

28. The automated machine-readable symbol reader system of claim 16 wherein the at least one processor:
determines whether a logo is present or absent in each of the plurality of images; and
determines a descriptive measure for each of the plurality of images based on the determined presence or absence of a logo in each of the plurality of images.

29. The automated machine-readable symbol reader system of claim 16 wherein the at least one processor:
determines, for each of the plurality of images, a descriptive measure indicative of a likelihood that an operator will identify the exception object by viewing the image.

30. The automated machine-readable symbol reader system of claim 29 wherein the at least one processor:
causes the display device to first display one of the plurality of images determined to have the highest likelihood that an operator will identify the exception object by viewing the image.

31. An automated machine-readable symbol reader system, comprising:
a machine-readable symbol reader that reads machine-readable symbols associated with objects transported through a view volume;
an exception identification subsystem that detects an exception object that has been transported into or through the view volume without being successfully identified by the machine-readable symbol reader;
an exception handling subsystem that includes:
a display device;
a database of stored visual features data of known objects;
at least one image capture device that obtains a plurality of images of the exception object; and
at least one processor operatively coupled to the display device, the at least one database and the at least one image capture device, the at least one processor:
extracts a plurality of visual features from each of the plurality of images of the exception object;
identifies matches between the extracted visual features and the stored visual features data of known objects to determine whether a logo is present or absent in each of the plurality of images;
determines a descriptive measure for each of the plurality of images based on the determined presence or absence of a logo in each of the plurality of images; and
causes at least one of the plurality of images of the exception object to be displayed on the display device based on the determined descriptive measure.

32. The automated machine-readable symbol reader system of claim 31, further comprising:
- a conveyor subsystem that transports the object into and through the view volume,
- wherein the at least one image capture device comprises a plurality of image capture devices positioned along the conveyor subsystem at different locations to provide different fields of view.

33. The automated machine-readable symbol reader system of claim 31 wherein the at least one processor:
- extracts one or more geometric point features, one or more scale-invariant features, or one or more color features from each of the plurality of images.

34. The automated machine-readable symbol reader system of claim 31 wherein the exception handling subsystem further comprises a machine-readable symbol reader that reads a machine-readable symbol of the exception object to resolve an exception associated with the exception object.

35. The automated machine-readable symbol reader system of claim 31 wherein the display device is a handheld display device.

\* \* \* \* \*

UNITED STATES PATENT AND TRADEMARK OFFICE
CERTIFICATE OF CORRECTION

| | | |
|---|---|---|
| PATENT NO. | : 9,239,943 B2 | Page 1 of 1 |
| APPLICATION NO. | : 14/289950 | |
| DATED | : January 19, 2016 | |
| INVENTOR(S) | : Michael Svetal | |

It is certified that error appears in the above-identified patent and that said Letters Patent is hereby corrected as shown below:

On The Title Page,

Item (57):
"Systems and methods for exception handling in an automated machine-readable symbol reader system having a machine-readable symbol reader that captures machine-readable symbols within a view volume. One or more image capture devices obtain a plurality of images of an exception object in response to an exception generated in the view volume. A processor receives the images, identities visual object recognition features from each image, and compares the features to determine one or more descriptive measures indicative of a likelihood that an operator (e.g., store employee) will be able to identify the exception object by viewing the image. The processor displays at least one of the images (e.g., the most descriptive image) on a display device according to the descriptive measure so that an operator can rapidly identify the identity of the exception object and take steps to resolve the exception." should read, --Systems and methods for exception handling in an automated machine-readable symbol reader system having a machine-readable symbol reader that captures machine-readable symbols within a view volume. One or more image capture devices obtain a plurality of images of an exception object in response to an exception generated in the view volume. A processor receives the images, identifies visual object recognition features from each image, and compares the features to determine one or more descriptive measures indicative of a likelihood that an operator (e.g., store employee) will be able to identify the exception object by viewing the image. The processor displays at least one of the images (e.g., the most descriptive image) on a display device according to the descriptive measure so that an operator can rapidly identify the identity of the exception object and take steps to resolve the exception.--.

Item (56):
--8,348,169 B2 01/13 Wang et al--, has been omitted from the face of the patent.

Signed and Sealed this
Twenty-eighth Day of June, 2016

Michelle K. Lee
*Director of the United States Patent and Trademark Office*